United States Patent [19]

Schüler

[11] Patent Number: 5,767,029
[45] Date of Patent: Jun. 16, 1998

[54] METAL-CERAMIC COMPOSITE MATERIAL

[75] Inventor: Claus Schüler, Widen, Switzerland

[73] Assignee: ABB Research Ltd., Zurich, Switzerland

[21] Appl. No.: 748,511

[22] Filed: Nov. 8, 1996

[30] Foreign Application Priority Data

Nov. 30, 1995 [DE] Germany .................. 195 44 697.6

[51] Int. Cl.$^6$ .................... C04B 35/04; C22C 29/12
[52] U.S. Cl. .................... 501/108; 252/514; 252/521; 505/236; 505/238; 505/239
[58] Field of Search .................... 501/108; 252/514, 252/521; 505/236, 238, 239

[56] References Cited

U.S. PATENT DOCUMENTS 5,447,908   9/1995   Itozaki et al. .................... 505/239
5,512,541   4/1996   Konishi et al. .................... 505/239

OTHER PUBLICATIONS

"A composition of the wettability of copper-copper oxide and silver-copper oxide on polycrystalline alumina", Meier, et al., Journal of Materials Science, 30, 1995, pp. 4781–4786. No Month.

*Primary Examiner*—Karl Group
*Attorney, Agent, or Firm*—Burns, Doane, Swecker & Mathis, L.L.P.

[57] ABSTRACT

Metal-ceramic composite materials which combine advantageous properties of ceramic and metal and have the composition $(Mg_{1-x}Cu_x)O+Ag_y$, where $0.03 \leq x \leq 0.25$ and $0.001 \leq y \leq 0.5$, can be produced in a one-stage process. In this process, sintering is carried out in air at a sintering temperature in the temperature range of 980° C.–1100° C. for a sintering time in the range of 1.5–2.5 hours. The rate of temperature rise from room temperature to the sintering temperature is in the range of 8–50 K/min. When $0.01 \leq y \leq 0.1$, such composite materials are suitable as materials having high toughness for low-friction, self-lubricating sliding bearings, in particular of ceramic. When $0.1 \leq y \leq 0.2$, they are suitable as electrical contact materials in fuel cells and for abrasion-resistant sliding contacts. When $0.15 \leq y \leq 0.5$, the composite materials have a high conductivity.

7 Claims, No Drawings

METAL-CERAMIC COMPOSITE MATERIAL

BACKGROUND OF THE INVENTION

1. Field of the Invention

The invention starts out from a metal-ceramic composite material and from a process for its production. The invention also relates to uses of the composite material.

2. Discussion of Background

By way of the preamble of claims 1 and 4, the invention incorporates by reference prior art as is known from A. M. Meier et al., A comparison of the wettability of copper-copper oxide and silver-copper oxide on polycrystalline alumina, Journal of Materials Science, 30 (1995), pp. 4781-4786. In that reference, pellets of aluminum oxide ($Al_2O_3$) having a porosity of 30% were completely penetrated by a melt of silver having a CuO content of 5 mol% when the sample was held for 10 minutes at a temperature of 1050° C. When the melt contained 20 molt% of copper, 5 mol% of copper oxide (CuO), remainder silver, no penetration into the sample occurred at 1050° C., but only at a temperature of 1250° C.

A disadvantage here is that the production of the composite material requires a two-stage process which necessitates a vacuum and, for producing the aluminum oxide ceramic, a sintering temperature of about 1600° C. and thus a relatively expensive sintering furnace.

For numerous applications it is desirable to have materials which combine the advantageous properties of ceramic and metal. Such materials comprise at least one ceramic component and at least one metallic component; they are also known as CERMETs. Only composite materials whose metallic components consist of nobel metals can be sintered in air; all other metallic components require sintering in vacuo or in a reducing gas atmosphere.

The sintering temperatures of typical ceramic components are high; they are about 1600° C. for $Al_2O_3$, about 1700° C. for $ZrO_2$ and about 1600° C. for MgO. Composite materials whose sintering temperature is significantly lower are desired.

SUMMARY OF THE INVENTION

Accordingly, one object of the invention is to provide a novel metal-ceramic composite material which can be produced in a one-stage process and can be sintered to full density at a sintering temperature of $\leq 1200°$ C.

This object is achieved by the invention as defined in claims 1 and 4. Advantageous embodiments of the invention are defined in the dependent claims.

An advantage of the invention is that sintering can be carried out in ambient air. A comparatively cheap sintering furnace having a maximum temperature of 1100° C. suffices for sintering the composite material.

The composite material of the invention is suitable as a substrate material for thin and thick layers of high temperature superconductors. There is no degrading reaction with superconductors, since MgO, CuO and silver are all compatible with high temperature superconductors.

DESCRIPTION OF THE PREFERRED EMBODIMENTS

Copper oxide as sintering aid and silver as metallic component are added to magnesium oxide to give a composition having the stoichiometric formula: $(Mg_{1-x}Cu_x)O + Ag_y$, where $0.03 \leq x \leq 0.25$ and $0.001 \leq y \leq 0.5$, preferably with $0.05 \leq x \leq 0.2$.

The selection of y depends on the application for which the composite material is intended; use is made of:

$0.001 \leq y \leq 0.03$ for materials having good electrical insulation properties and improved fracture toughness.

$0.01 \leq y \leq 0.1$ for materials having high mechanical strength and fracture toughness, for low-wear, low-friction, self-lubricating materials in mechanical sliding bearings, preferably of ceramic.

$0.1 \leq y \leq 0.2$ for electrical contact materials in high temperature fuel cells and for abrasion-free, wear-free electrical contacts, in particular sliding contacts.

$0.15 \leq y \leq 0.5$ for materials having a high electrical and thermal conductivity together with good mechanical strength.

The optimum value of x is then found empirically within the range indicated. The criterion for the optimum value of x is sintering at as low as possible a temperature to give a relative density of $\geq 0.95$. For example, a range of $0.04 \leq x \leq 0.07$ is optimum for y=0.15. For this composition, the sintering temperature of 1080° C. leads to a relative density of $\geq 0.96$ for a sintering time of 2 hours.

Sintering is carried out in air. The sintering temperature should be as low as possible since the vapor pressure of Ag at its melting point of 960° C. is already $10^4$ Pa. At higher temperatures, the silver is rapidly vaporized from the composite material. This can make the distribution of the silver in the composite material and thus the material properties inhomogeneous and make the material industrially unusable.

Mechanical applications:

When $0.015 \leq y \leq 0.1$, the fracture toughness of the composite material is much higher than for a pure MgO ceramic. Such a composite material can advantageously be used where a ceramic having relatively high tensile and flexural strengths is required.

Such composite materials have self-lubricating properties which make them suitable as dry sliding bearings. In sliding bearings, these composite materials have good emergency running properties.

Electrical applications:

When $y \geq 0.08$, the composite material is electrically conductive and at y=0.15 has a conductivity of about $10^5$ $(\Omega cm)^{-1}$. Since at the same time the silver content of the composite material produces a good fracture toughness, such a composite material has many uses in moving and fixed electrical contacts. Advantageous properties compared with contacts of pure metals such as silver are:

low tendency to weld together, low abrasion as a result of high hardness, low erosion by burning as a result of the high melting point of MgO.

EXAMPLE 1 for the production of a composite material having the composition $Mg_{0.8}Cu_{0.05}Ag0.15$:

8.5 mol of $Mg(OH)_2$ powder were stirred into 350 ml of water. In addition, 0.5 mol of crystalline $Cu(NO_3)_2 \cdot 3 H_2O$ was dissolved in 350 ml of water. The two mixtures were then combined and stirred at 80° C. for 60 minutes. During this time, the reaction $8.5\ Mg(OH)_2 + 0.5\ Cu(NO_3)_2 \rightarrow 0.5\ Mg(NO_3)_2 + 0.5\ Cu(OH)_2 + H_2O + 8\ Mg(OH)_2$ proceeds to the right to completion, with 0.5 mol of $Cu(OH)_2$ being precipitated and 0.5 mol of $Mg(NO_3)_2$ being formed. The precipitation product, in which $Mg(OH)_2$ and $Cu(OH)_2$ are intimately mixed and present as very fine particles, is filtered off and washed twice with water to completely remove the dissolved $Mg(NO_3)_2$. The washed filter cake is dried and subsequently calcined for 2 hours at a temperature of 650°

C. This converts Mg(OH)$_2$ into MgO and Cu(OH)$_2$ into CuO. The latter begins to diffuse into the MgO.

In a polyethylene bottle, 0.75 mol of Ag$_2$O powder is added to the calcination product, then 500 ml of ethanol and 1 kg of milling media made of yttrium-stabilized ZrO$_2$ ceramic and having a diameter of 5 mm. This mixture is deagglomerated and mixed on rollers for more than 10 hours. 6 g of triethanolamine were additionally added as dispersant. After drying the deagglomerated mixture, this is sieved and the powder obtained is pressed in a cylindrical steel die to form disks having a thickness of 2 mm and a diameter of 25 mm. Sintering is carried out in air in a muffle furnace using the following temperature/time profile:

temperature rise of 10 K/min from room temperature to 1010° C., hold time of 2 hours at 1010° C., cooling to room temperature over a period of 24 hours.

Above 350° C., Ag$_2$O decomposes completely to 2 Ag +½ O$_2$. The sintered composite material had no open porosity and thus a density of ≧96%. The linear shrinkage was 24% and the electrical conductivity was 5×10$^4$ (Ωcm)$^{-1}$.

EXAMPLE 2 for the production of a composite material having the composition Mg$_{0.8}$Cu$_{0.05}$Ag$_{0.15}$:

10 mol of Mg(OH)$_2$ powder were stirred into 400 ml of water. In addition, 0.5 mol of crystalline Cu(NO$_3$)$_2$·3 H$_2$O was dissolved in 350 ml of water and 1.5 mol of AgNO$_3$ was dissolved in 350 ml of water. Both solutions are quickly added to the Mg(OH)$_2$ suspension and this mixture is heated whilst stirring at 80° C. for 1 hour. During this time, the following reactions:

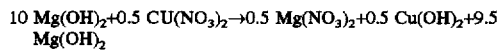

and

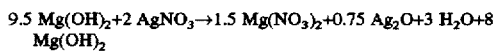

proceed to the right to completion, with 0.5 mol of Cu(OH)$_2$ and 0.75 mol of Ag$_2$O being precipitated and 2 mol of Mg(NO$_3$)$_2$ being formed. The precipitation products are present as fine particles and are intimately mixed with Mg(OH)$_2$. The suspension was filtered and washed twice with water to completely remove the dissolved Mg(NO$_3$)$_2$. The washed filter cake was then dried and subsequently calcined for 2 hours at a temperature of 650° C. This converts Mg(OH)$_2$ into MgO and Cu(OH)$_2$ into CuO. Ag$_2$O decomposes to 2 Ag+½ O$_2$, and CuO begins to diffuse into the MgO.

In a polyethylene bottle, the calcination product was deagglomerated on rollers using 2 kg of milling media made of yttrium-stabilized ZrO$_2$ ceramic and having a diameter of 5 mm. As dispersant, 800 ml of ethanol and 5 g of castor oil were additionally added.

After drying the deagglomerated mixture, the mixture was sieved and the powder obtained was pressed in a cylindrical steel die to form disks having a thickness of 2 mm and a diameter of 25 mm. Sintering was carried out in air in a muffle furnace using the following temperature/time profile:

temperature rise of 10 K/min from room temperature to 1010° C.

hold time of 2 hours at 1010° C., cooling to room temperature over a period of 24 hours.

The sintered composite material had no open porosity and thus a density of ≧96%. The electrical conductivity was 6×10$^4$ (Ωcm)$^{-1}$. The precipitation of both components, viz. CuO and also Ag$_2$O, is advantageous because it results in CuO and Ag forming very small particles and being uniformly distributed in the MgO. This gives sintered composite materials having an MgO grain size of about 1 μm and particularly good mechanical and electrical properties. The mean MgO grain size is <3μm in each case.

It is important that sintering is carried out at a sintering temperature of <1300° C., preferably <1200° C., for a sintering time of <5 hours and that the rate of temperature rise from room temperature to the sintering temperature is <50 K/min. Sintering should preferably be carried out at a sintering temperature in the temperature range of 980° C.–1100° C. for a sintering time in the range of 1.5–2.5 hours and the rate of temperature rise from room temperature to the sintering temperature is in the range of 8–50 K/min.

The composite material of the invention can be brought into the desired shape using all methods customary in the technology of ceramics or powder metallurgy, e.g. by dry pressing, wet pressing, injection molding and tape casting, particularly for thin sheets.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A metal-ceramic composite material comprising silver, magnesium oxide and copper oxide, wherein the composite material has a composition (Mg$_{1-x}$Cu$_x$)O+Ag$_y$, where 0.03≦x≦0.25 and 0.001≦y≦0.5.

2. A metal-ceramic composite material as claimed in claim 1, wherein 0.05≦x≦0.2.

3. A metal-ceramic composite material as claimed in claim 1, having a mean MgO grain size <3 μm.

4. A metal-ceramic composite material of claim 1, wherein 0.001≦y≦0.03 and having good electrical insulation properties and fracture toughness.

5. A metal-ceramic composite material of claim 1, wherein 0.01<y<0.1 and having a high fracture toughness and for low-friction, self lubricating materials for mechanical sliding bearings.

6. A metal-ceramic composite material of claim 1, wherein 0.1<y<0.2 for electrical contact materials in high temperature fuel cells and abrasion-free, wear-free electrical contacts.

7. A metal-ceramic composite material of claim 1, wherein 0.15<y<0.5 and having a high electrical and thermal conductivity and good mechanical strength.

* * * * *